United States Patent Office 2,964,456
Patented Dec. 13, 1960

2,964,456
STABLE WAXING EMULSIONS

Frank L. Saunders, Midland, and James H. Oswald, Bay City, Mich., assignors to The Dow Chemical Company, Midland, Mich., a corporation of Delaware No Drawing. Filed Apr. 26, 1957, Ser. No. 655,179

14 Claims. (Cl. 204—154)

This invention relates to the provision of stable emulsions for waxing and similar protective coating purposes that are essentially comprised of a polyethylene wax or the like relatively low molecular weight paraffinic or alkane polymeric constituent blended with desirable film-forming polymers of suitable vinyl monomers, particularly styrene and related alkenyl aromatic monomers, and graft copolymers consisting of the polyethylene wax interpolymerized with the vinyl monomer.

Betterment of the film-forming properties of polyethylene wax emulsions in order, upon application of such an emulsion over floors and other surfaces, to obtain protective films having optimum characteristics of hardness and clarity (among other augmented properties) has been a desideration of long standing in the art. Much effort has been directed along these lines. For example, attempts have been made to blend such beneficial ingredients as polystyrene and similarly advantageous film-forming vinyl polymers in polyethylene wax emulsions, which are generally formulated with or emulsified in an aqueous vehicle. Such emulsified blends, however, are exceedingly difficult to prepare satisfactorily. And, even after an emulsification has been accomplished, the results are somewhat fugitive or relatively transient in nature. The emulsified polymer blended compositions, at best, seem almost unavoidably to be physically quite unstable.

It would be an advantage, and it is among the principal objectives of the present invention, to provide improved waxing emulsions of the indicated variety that would be exceptionally stable to physical separation while being especially well suited to furnish superior waxing and like protective coating effects.

To this end, significantly ameliorated waxing emulsions may be readily provided by a process which comprises emulsifying a polyethylene wax or the like polymeric alkane wax composition and a vinyl monomer that is adapted to be polymerized to a film-forming polymer in a suitable non-polymerizable liquid vehicle (preferably in water) and subsequently subjecting the emulsion to ionizing irradiation in a high energy field in order to polymerize the vinyl monomer into both film-forming vinyl polymers and graft copolymers of the vinyl monomer with the polymeric alkane constituent. The resulting wax emulsion is exceptionally stable in its nature and is usually found to be capable of providing films that are harder and less sensitive or susceptible to being adversely affected by water than films from analogous emulsified polymer blends that have been prepared by the conventional mere physical methods.

The precise composition of the wax emulsion that is obtained by practice of the present invention may be varied over wide ranges in order to provide products having particularly desired properties and characteristics. Thus, the amount of the vinyl monomer that is initially emulsified with the polyethylene wax or the like prior to the irradiation polymerization step of the invention may be a relatively small quantity so that only a minor proportion, say as low as about 1 percent by weight, of the finally obtained polymeric solids consists of the polymerized products of the vinyl monomer (excluding any and all polymeric alkane portions of the resulting graft copolymers). Conversely, a very large amount of vinyl monomer may be employed in the initial emulsion so that the great preponderance, for example, as much as 99 percent by weight, of the polymeric solids consists of the polymerized vinyl monomer. Generally, however, extremely beneficial results may be obtained when an amount of the vinyl monomer is employed such that between about 10 and 60 and most advantageously in the neighborhood of 25 percent by weight of the finally obtained polymeric solids consists of the polymerized products of the vinyl monomer.

The emulsions may be prepared to contain any desired content of polymeric solids. While a proportion of polymeric solids in the amount of about 20 percent by weight is usually suitable, excellent results may also be obtained with emulsions containing as low as 1 and as high as 40 percent by weight, based on the total weight of the finally obtained wax emulsion. A desirable lower limit for the content of polymeric solids in the emulsion is, of course, governed by economic considerations while the upper limit in particular instances cannot be so great as to endanger or interfere with the physically stable dispersion that is desired for the emulsified products.

In this connection, it is usually highly advantageous and may frequently be a practical requirement to employ emulsifying agents and other dispersing assistants in the preparation of the initial emulsion with the polymeric alkane wax and the vinyl monomer prior to the polymerization. Thus morpholine and the like emulsifiers, including triethanolamine and substances cognate thereto as well as 10 to 20 carbon atom-containing fatty acids, such as oleic acid, higher alkyl sodium sulfates and sulfonates, alkyl aromatic sodium sulfonates and the like may be effectively utilized in the initial emulsification. It is usually beneficial to employ between about 10 and 50 percent by weight of each of such ingredients, based on the weight of the polymeric alkane constituent in the emulsion, to achieve the best results. In many instances it may be an especial advantage and a highly desirable practice to utilize various vinyl fatty acids in place of the conventional materials. Such unsaturated fatty acid derivatives tend to become involved in the polymerization reaction that is effected so as to interpolymerize with the vinyl monomer. This is quite likely to result in a product emulsion that is capable of providing even harder and more improved wax films than may be obtained from emulsions prepared with the plain fatty acid additaments.

In order to prepare the initial emulsions prior to the final step of polymerization by irradiation in a high energy field, it is generally suitable to melt the polymeric alkane constituent such as the polyethylene wax with the fatty acid additament; then to add the morpholine or equivalent ingredient and melt the mixture, say at a temperature between 120 and 130° C.; then to add the vinyl monomer to the mixture and, with efficient mechanical agitation thereof, to combine the mass with the emulsification vehicle at a temperature just beneath the boiling point of the latter. When water, as is most frequently the case, is employed as the vehicle, it is generally appropriate to add the molten mass to the water at a temperature of 95 to 99° C. After an initial emulsion has been so attained, and with continued stirring, it is usually advantageous to permit it to cool (preferably while covered and protected from free contact with the atmosphere) to a temperature in the neighborhood of 40–50° C. before subjecting it to the polymerizing influence of the high energy field of irradiation.

The ionizing high energy radiation that is utilized for polymerizing the vinyl monomer in the initially provided emulsion to obtain the desired final product is of the type which provides emitted photons having an intrinsic energy of a magnitude which is greater than the planetary electron binding energies which occur in the reacting materials. Such high energy radiation is conveniently available from various radioactive materials which provide beta or gamma radiation as, for example, radioactive cobalt, nuclear reactor fission products and the like. However, if it should be preferred, high energy radiation from such sources as electron beam generators, X-ray generators and the like may also be utilized. It is beneficial to employ the high energy radiation in the field of at least about 40,000 roentgens per hour or an equivalent intensity in order to avoid the presence of unpolymerized monomeric substances in the emulsified polymeric product. If too low a radiation dose is employed there may not be obtained the most desirable type of wax emulsion product in which the vinyl monomer that has been employed is polymerized to a substantially complete extent. In most cases, a high energy radiation in a field of about 200,000 roentgens per hour (or in a field of equivalent intensity) until a total dosage of about 5 million roentgen equivalent physicals (mrep.) has been achieved may be found to be satisfactory. A 1 mrep. dosage, incidentally, equals $1.11 \times 10^6$ roentgens. A roentgen, as is commonly understood, is the amount of high energy radiation as may be provided in a radiation field which produces in one cubic centimeter of air at 0° C. and 760 millimeters of mercury pressure such a degree of conductivity that one electrostatic unit of charge is measured at saturation (when the secondary electrons are fully utilized and the wall effect of the chamber is avoided). High energy fields of excessive intensity should be avoided in order to circumvent the possibility of degrading or decomposing the materials being polymerized in the emulsion or the polymerized emulsified product.

The polymeric alkane constituent that is utilized may advantageously be a liquid or low melting solid waxy material. Advantageously, as has been indicated, polyethylene wax may be employed such as that variety of polyethylene having a molecular weight between about 1,500 and 6,000. Most advantageously, a solid polyethylene wax having an average molecular weight of about 3,000 and a melting point of about 95–100° C. may be used, particularly when it is obtained in the emulsifiable form. Such a polymeric alkane material is available from the Allied Chemical & Dye Corporation under the trade-designation "A-C Polyethylene 629," an easily emulsifiable substance.

When it is desired to practice the present invention with the apparatus that is ordinarily utilized in the practice of conventional techniques, it is convenient and an advantage for the vinyl monomer that is employed to be sufficiently high boiling so that it is susceptible to being incorporated in the molten wax mass without undue volatilization. It is usually desirable for this reason to employ a vinyl monomer that boils at a temperature in excess of at least about 100° C. Of course, if suitable pressure equipment is available, more volatile monomers can readily be employed. Under such circumstances the precise fugacity of the monomer that is utilized is a relatively immaterial matter. As has been indicated, alkenyl aromatic monomers capable of being polymerized to good film-forming polymers are usually preferred for employment in the practice of the invention. Such vinyl monomers may be defined as those compounds which conform to the general formula: $Ar:(CR=CH_2)_x$ wherein Ar is an aromatic radical and R is selected from the group consisting of a hydrogen atom and a methyl radical and $x$ may have a numerical value of one or two. Styrene, ar-methyl styrene or vinyltoluene, mono- and di-chlorostyrene and ar-dimethyl styrene may frequently be utilized with special benefit. Various divinyl aromatic alkenyl aromatic monomers such as divinyl benzene may be employed with commensurate advantage. Other vinyl monomers including methyl methacrylate, ethyl acrylate and the like may also be found to provide excellent results in the practice of the invention.

To afford additional delineation, a stable wax emulsion was prepared by melting about 15 parts by weight of "A-C Polyethylene 629" and adding thereto about 6 parts by weight of oleic acid. About 6 parts by weight of morpholine was then added and the mass molten at about 120–130° C. Fifteen parts by weight of styrene monomer were then added to the molten mass and the entire composition was slowly added, with rapid stirring, to about 138 parts by weight of water at a temperature of about 95° C. With continued agitation by a mechanical mixing device, the initially emulsified mass was allowed to cool to about 45° C. while being maintained in a covered condition. It was then irradiated with gamma rays from a radioactive cobalt source at an intensity of about 591,300 roentgens per hour for a period of about 8½ hours until a total dosage of about 5 megreps. had been attained. The resulting wax emulsion, which was exceedingly stable in the physical sense, was white in color, had practically no monomer odor, and contained about 20 percent by weight of emulsified polymeric solids. The emulsion produced excellent waxy cast films which were clearer and had greater hardness than an equivalent physically attained emulsion of the polyethylene wax and already polymerized polystyrene. Besides this, the polystyrene modified irradiated product produced a film that was considerably less sensitive to water and aqueous detergent solutions than conventionally obtained materials of the same general type.

Similar excellent results were obtained when the foregoing procedure was repeated with initial emulsions containing about 25 percent by weight of styrene monomer, based on the weight of the polyethylene wax in the composition and like proportions of the remaining ingredients. Unusually good results were also experienced when similar initial emulsions were irradiation polymerized which contained 50 percent by weight of styrene; 25 percent by weight of divinyl benzene; and a mixture of 12½ percent by weight each of styrene and divinyl benzene.

Besides being useful for floors and the protective wax coating of similar surfaces, the improved wax emulsion products of the present invention may be employed with satisfaction in formulations to coat paper as well as in sealing finishes for textile fabrics and for incorporation in various polishing compositions.

What is claimed is:

1. Process comprising emulsifying a polymeric alkane wax composition and a vinyl monomer that is adapted to be polymerized to a film forming polymer in a nonpolymerizable liquid vehicle and subsequently subjecting the emulsified mass to ionizing high energy irradiation in a high energy field until a total dosage of up to about 5 million roentgen equivalent physicals has been effected and substantially all of the vinyl monomer is polymerized into both film-forming vinyl polymers and graft copolymers with the polymeric alkane constituent and provide a stable emulsified product.

2. Process comprising emulsifying in water a polymeric alkane wax composition with between about 10 and 60 percent by weight, based on the weight of the alkane, of a vinyl monomer that is adapted to be polymerized to a film-forming polymer and subsequently subjecting the emulsified mass to ionizing high energy irradiation in a high energy field having an intensity of at least about 40,000 roentgens per hour until a total dosage of up to about 5 million roentgen equivalent physicals has been effected and substantially all of the vinyl monomer is polymerized into both film-forming vinyl polymers and graft copolymers with the polymeric alkane constituent and provide a stable emulsified product.

3. Process comprising emulsifying in water a polymeric alkane wax composition with between about 10 and 60 percent by weight of an alkenyl aromatic monomer, based on the weight of the alkane, and subsequently subjecting the emulsified mass to ionizing high energy irradiation in a high energy field having an intensity of at least about 40,000 roentgens per hour until a total dosage of up to about 5 million roentgen equivalent physicals has been effected and substantially all of the monomer is polymerized into both alkenyl aromatic polymers and alkenyl aromatic graft copolymers with the polymeric alkane constituent and provide a stable emulsified product.

4. The process of claim 3 wherein each 10 to 40 total parts by weight of the polymeric alkane constituent is emulsified with about 100 parts by weight of water prior to polymerization.

5. Process comprising melting polyethylene wax with between about 10 and 50 percent by weight, based on the weight of the wax, of a fatty acid material that contains from about 10 to 20 carbon atoms in its molecule and between about 10 and 50 percent by weight, based on the weight of the wax, of morpholine; adding to the melt between about 10 and 60 percent by weight, based on the weight of the resulting polymeric solids, of styrene; emulsifying the molten mass with water at near boiling temperatures in an amount to provide an emulsified mass containing a total of between about 10 and 40 percent by weight, based on the weight of the emulsion, of wax and styrene; cooling the emulsified mass while maintaining it in uniform dispersion; and subsequently subjecting it to high energy irradiation in a high energy field of at least about 40,000 roentgens per hour until a total dosage of up to about 5 million roentgen equivalent physicals has been effected and substantially all of the monomer is polymerized into both polystyrene and styrene graft copolymers with the polyethylene wax.

6. The process of claim 5, wherein the fatty acid material is oleic acid.

7. Process comprising melting polyethylene wax with between about 10 and 50 percent by weight, based on the weight of the wax, of a fatty acid material that contains from about 10 to 20 carbon atoms in its molecule and between about 10 and 50 percent by weight, based on the weight of the wax, of morpholine; adding to the melt between about 10 and 60 percent by weight, based on the resulting polymeric solids, of divinyl benzene; emulsifying the molten mass with water at near boiling temperatures in an amount to provide an emulsified mass containing a total of between about 10 and 40 percent by weight, based on the weight of the emulsion, of wax and divinyl benzene; cooling the emulsified mass while maintaining it in uniform dispersion; and subsequently subjecting it to high energy irradiation in a high energy field of at least about 40,000 roentgens per hour until a total dosage of up to about 5 million roentgen equivalent physicals has been effected and substantially all of the divinyl benzene monomer is polymerized into both polydivinylbenzene and divinyl benzene graft copolymers with the polyethylene wax.

8. The process of claim 7, wherein the fatty acid material is oleic acid.

9. Process comprising melting polyethylene wax with between about 10 and 50 percent by weight, based on the weight of the wax, of a fatty acid material containing from about 10 to 20 carbon atoms in its molecule and between about 10 and 50 percent by weight, based on the weight of the wax, of morpholine; adding to the melt between about 10 and 60 percent by weight, based on the weight of the resulting polymeric solids, of methyl methacrylate; emulsifying the molten mass with water at near boiling temperatures in an amount to provide an emulsified mass containing a total of between about 10 and 40 percent by weight, based on the weight of the emulsion, of wax and methyl methacrylate; cooling the emulsified mass while maintaining it in uniform dispersion; and subsequently subjecting it to high energy irradiation in a high energy field of at least about 40,000 roentgens per hour until a total dosage of up to about 5 million roentgen equivalent physicals has been effected and substantially all of the methyl methacrylate monomer is polymerized into both polymethylmethacrylate and methyl methacrylate graft copolymers with the polyethylene wax.

10. The process of claim 9, wherein the fatty acid material is oleic acid.

11. A stable waxing emulsion product comprised of a water dispersed mixture of a polymeric alkane wax composition with between about 10 and 60 percent by weight, based on the weight of the alkane, of a polymerized alkenyl aromatic monomer, a least a portion of said alkenyl aromatic polymer being in the form of a graft copolymer with the polymeric alkane constituent, any balance being a film-forming vinyl polymer of said polymerized alkenyl aromatic monomer.

12. A stable waxing emulsion product comprised of a water dispersed mixture consisting of water containing in emulsion therein between about 10 and 40 weight percent, based on the weight of the emulsion, of polyethylene wax and polymerized styrene, said polymerized styrene being present in an amount between about 10 and 60 percent by weight of the total polymeric solids in said emulsion, at least a portion of said polymerized styrene being in the form of a graft copolymer on said polyethylene wax, any balance being a film-forming styrene polymer; between about 10 and 50 percent by weight, based on the weight of the wax, of a fatty acid material that contains from about 10 to 20 carbon atoms in its molecule; and between about 10 and 50 percent by weight, based on the weight of the wax, of morpholine.

13. A stable waxing emulsion product comprised of a water dispersed mixture consisting of water containing in emulsion therein between about 10 and 40 weight percent, based on the weight of the emulsion, of polyethylene wax and polymerized divinyl benzene, said polymerized divinyl benzene being present in an amount between about 10 and 60 percent by weight of the total polymeric solids in said emulsion, at least a portion of said polymerized divinyl benzene being in the form of a graft copolymer on said polyethylene wax, any balance being a film-forming divinyl benzene polymer; between about 10 and 50 percent by weight, based on the weight of the wax, of a fatty acid material that contains from about 10 to 20 carbon atoms in its molecule; and between about 10 and 50 percent by weight, based on the weight of the wax, of morpholine.

14. A stable waxing emulsion product comprised of a water dispersed mixture consisting of water containing in emulsion therein between about 10 and 40 weight percent, based on the weight of the emulsion, of polyethylene wax and polymerized methyl methacrylate, said polymerized methyl methacrylate being present in an amount between about 10 and 60 percent by weight of the total polymeric solids in said emulsion, at least a portion of said polymerized methyl methacrylate being in the form of a graft copolymer on said polyethylene wax, any balance being a film-forming methyl methacrylate polymer; between about 10 and 50 percent by weight, based on the weight of the wax, of a fatty acid material that contains from about 10 to 20 carbon atoms in its molecule; and between about 10 and 50 percent by weight, based on the weight of the wax, of morpholine.

References Cited in the file of this patent

UNITED STATES PATENTS

| | | |
|---|---|---|
| 2,695,277 | Pabst et al. | Nov. 23, 1954 |
| 2,766,214 | Erchak et al. | Oct. 9, 1956 |
| 2,837,496 | Vandenberg | June 3, 1958 |

FOREIGN PATENTS

| | | |
|---|---|---|
| 722,413 | Great Britain | Jan. 26, 1955 |
| 749,801 | Great Britain | May 30, 1956 |

OTHER REFERENCES

"Radiation Applications," pages 1–8, March 1955.
Renfrew et al.: "Polythene," pages 241–246 (1957).
B.N.L. 367, A.E.C., pp. 27, 28, February 1956.
Schildknecht: Polymer Processes, pp. 111–174, 1956, by Interscience Pub., Inc., N.Y.
Dainton: "Nature," vol. 160, pp. 268, 269, Aug. 23, 1947.